April 30, 1935.　　E. RIEMENSCHNEIDER　　1,999,482
STATOR RING AND METHOD OF MAKING SAME
Filed Dec. 31, 1930
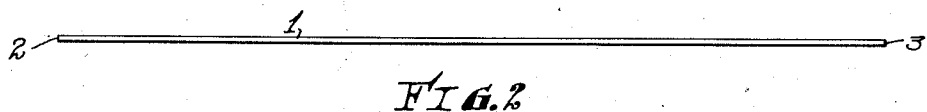
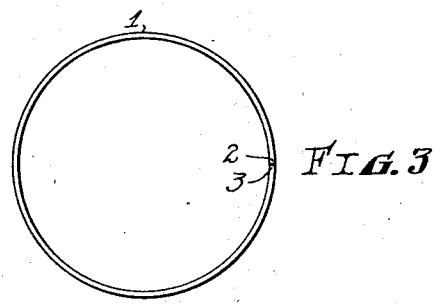
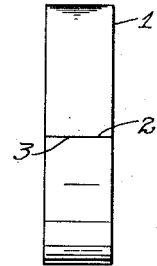
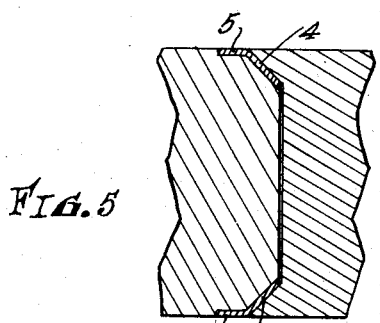
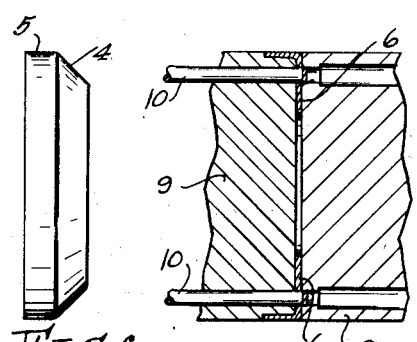
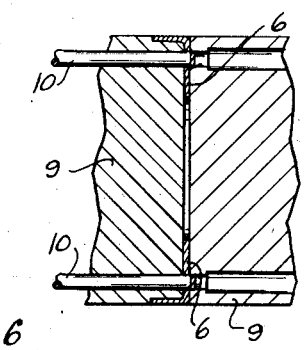
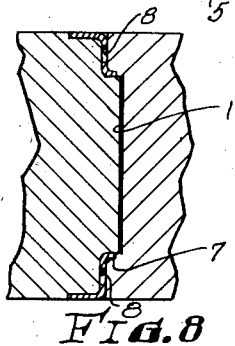
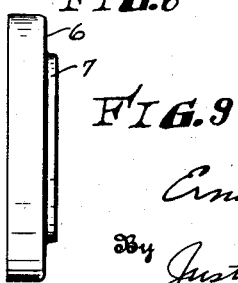
Inventor
Ernest Riemenschneider
By Justin H. Macklin
Attorney Patented Apr. 30, 1935

1,999,482

UNITED STATES PATENT OFFICE 1,999,482

STATOR RING AND METHOD OF MAKING SAME

Ernest Riemenschneider, Cleveland, Ohio, assignor to The Midland Steel Products Company, Cleveland, Ohio, a corporation of Ohio Application December 31, 1930, Serial No. 505,877

3 Claims. (Cl. 29—155.5)

My invention relates to stator rings and the like for electric motors and similar electrical devices and has for its objects a stator ring which is as strong and durable as those presently used and made of strip stock with no loss of material.

A further object of my invention is a stator ring which may be produced economically in large or small quantities and without highly specialized equipment and which lends itself to efficient machine production.

More specific but equally important objects are the production from ordinary strip metal stock of stator rings which are very accurate and uniform in dimensions and quality and suitable for close dimensioned work.

A stator ring formed in accordance with the method of my invention and the steps of the method are illustrated by the drawing, wherein, Figures 1 and 2 are respectively a plan view and side elevation of a length of strip metal stock from which a stator ring may be formed.

Figure 3 is a side elevation of the strip formed into an annulus in accordance with the first step of my method.

Figure 4 is an end elevation of the annulus illustrated in Figure 3.

Figure 5 is a sectional view illustrating the next successive forming step.

Figure 6 is an elevation of the strip after the operation illustrated in Figure 5.

Figures 7 and 8 illustrate the next successive step and the final step of my method.

Figure 9 is an elevation of the finished stator ring made in accordance with the method of my invention.

The position and use of stator rings for holding a laminated stator in a motor or other electrical device are well known and therefore I shall describe only the stator ring and a method of producing the same.

A blank of strip metal stock, as illustrated in Figures 1 and 2, of the gauge and width required for the particular stator ring is cut to the required length. The blank is then formed into an annular band or open end hollow cylinder having its axis parallel to the width of the strip. Such an annulus is illustrated in Figures 3 and 4, and is formed bringing together and securing together the ends of the blank, the ends being designated 2 and 3.

For effectively securing the ends together I find either autogenous or resistance welding of the ends for their full thickness very satisfactory, such welds being of high quality and not subject to splitting.

The annulus thus formed is placed in a suitable apparatus to deflect a portion thereof into a frusto-conical annulus, as indicated at 4 in Figures 5 and 6. The proportion of the length of the walls of the annulus thus deflected is dependent upon the amount of material required for the annular end wall 6 and flange 7 of the particular stator ring being formed. In the type of stator ring illustrated, as in most types, the portion 4 will include more than half and almost two-thirds of the length of the original annulus, measured parallel to the axis.

For purposes of illustration I have shown the frustro-conical portion 4 as being formed by stamping in suitable dies.

The stock, formed as illustrated in Figure 6, is next engaged by dies or other means to press the frustro-conical portion 4 substantially normal to the cylindrical portion 5 or at any angle thereto, depending upon the final shape of stator ring required. The frustro-conical portion 4 thus becomes an annular end wall of flange 6 of the finished ring as shown in Figure 9.

The next operation is to turn or otherwise form an annular flange 7 about the inner edge of the end wall 6. This may be done by die stamping as illustrated in Figure 8, or otherwise.

In most cases bolt or rivet openings 8 are required in the end wall 6. When such openings are required I find it more satisfactory to form them before forming the flange 7 so as not to deform the ring. An economical manner of forming these openings is illustrated in Figure 7.

As there illustrated, the frustro-conical portion 4 is engaged by dies 9 and deflected so as to lie normal to the body 5 of the annulus, as described. The dies may carry punches 10, which have a delayed motion relative to the dies, and engage the wall 6 and punch the holes 8 after the dies have moved to their innermost position.

If the quantity of rings to be produced warrants such equipment, the flanging die 11 of Figure 8 may be included in the die 9, the motion being delayed so that the die engages the wall 6 after the holes 8 are punched.

Instead of turning the wall 6 inwardly, it may be turned outwardly to form an annular outwardly extending flange. In such case the portion 4 would be formed by flaring outwardly a portion of the annulus, the smaller end of the frusto-conical portion thus being adjacent to the original annulus. Such is clear without illustration.

While I have described a method of forming stator rings, the practice of such a method is very effective for forming numerous other articles. It is especially desirable for forming articles having thick walls of comparatively heavy gage stock and in such cases may be used instead of the usual flat stamping and deep drawing operations.

Having thus described my invention and a stator ring formed thereby:

I claim:

1. As an article of manufacture, a stator ring formed by bending a single flat strip of metal into a cylindrical band having its axis parallel to the width of the metal stock and by deflecting a predetermined length of the band measured axially thereof inwardly and substantially normal to the axis of the band to form a flange deflecting the inner annular portion of said flange parallel to the band to form a second concentric flange.

2. As a new article of manufacture, a stator ring for motors formed from a flat strip of metal by bringing together and welding the ends of the strip to form an annulus having its axis parallel to the width of the strip and deflecting a predetermined length of the walls of the annulus at an angle to the remainder thereof to form a flange, and deflecting an annular extremity of the flange at an angle thereto to form a second flange parallel to the original annulus wall.

3. A method of forming rings from strip metal stock which includes bringing together the ends of the strip to form an annulus having its axis parallel to the width of the strip and welding the ends together, subjecting said annulus to the action of dies to deflect a portion of the annulus and dispose the deflected portion substantially normal to the axis of the annulus, and perforating the deflected portion while engaged between said dies.

ERNEST RIEMENSCHNEIDER.